United States Patent

Golembeski

[15] 3,694,761

[45] Sept. 26, 1972

[54] EQUALIZATION CIRCUIT EMPLOYING DIFFERENTIAL AMPLIFIER

[72] Inventor: John Joseph Golembeski, New Providence, N.J.

[73] Assignee: Bell Telephone Laboratories, Incorporated, Murray Hill, N.J.

[22] Filed: Nov. 5, 1970

[21] Appl. No.: 87,264

[52] U.S. Cl.......................330/24, 330/22, 330/30 D

[51] Int. Cl.................................................H03f 3/04

[58] Field of Search.......179/81 A, 81 B; 330/22, 30, 330/30 D, 38 M, 40, 69, 24; 333/28 R, 28 T

[56] References Cited

UNITED STATES PATENTS

| | | | |
|---|---|---|---|
| 3,564,439 | 2/1971 | Rao | 330/38 M |
| 3,573,496 | 4/1971 | Lake, Jr. et al. | 330/30 X |
| 3,153,203 | 10/1964 | Sem-Jacobsen et al. | 330/69 X |
| 3,280,347 | 10/1966 | Blokker et al. | 330/30 D |

*Primary Examiner*—Roy Lake
*Assistant Examiner*—Lawrence J. Dahl
*Attorney*—R. J. Guenther and Edwin B. Case

[57] ABSTRACT

An equalizer for a communication circuit employs a transistor differential amplifier which combines the functions of amplification, gain magnitude equalization and frequency response equalization.

13 Claims, 16 Drawing Figures

INVENTOR
J. J. GOLEMBESKI
BY E J Olinder
ATTORNEY

EQUALIZATION CIRCUIT EMPLOYING DIFFERENTIAL AMPLIFIER

BACKGROUND OF THE INVENTION

1. Field of the Invention

This invention relates to equalization circuits employed in communication networks, electrical testing equipment and electrical measuring equipment and particularly to such circuits that provide for the equalization of both gain and frequency.

2. Description of the Prior Art

Although equalization circuits in general and the equalization circuit in accordance with the invention in particular are found in a wide variety of communication and control systems, a telephone system provides a particularly useful example of a suitable environment for the invention. Accordingly, the disclosure of the invention presented herein is presented with particular attention to telephone system application.

In telephony it is obviously undesirable to permit the distance between a calling and a called subscriber to dictate the level and quality of transmission. The problem actually has two primary aspects. The first concerns transmission losses or distortions that arise from differences in transmission path lengths, whether microwave or cable, between central offices; this part of the problem is conventionally met by the use of repeaters that boost or amplify and by the use of central office equalization networks that compensate either for differences in level or frequency attenuation, or both.

The second aspect of the problem concerns the need to compensate for differences in individual subscriber loop length, the transmission path between the subscriber and the central office. In the prior art this problem has been met by the inclusion of an equalizer circuit or circuits as W. D. a part of the voice network of telephone subscriber sets. U.S. Pat. No. 2,645,681 issued to E.I. Green on July 14, 1953 is illustrative. Green discloses an equalizer arrangement that employs two negative temperature coefficient resistance elements, such as thermistors for example, one in shunt connection with the receiver and one in shunt connection with the transmitter of a telephone station set. Both of these elements are thermally coupled to circuit means, such as a filament, and the heat energy transfer to the shunt elements from the filament varies inversely with the resistance of the telephone loop. Variants of Green's equalizer are shown in U.S. Pat. No. 2,604,543 issued July 22, 1952 to W. D. Goodale, Jr., and in U.S. Pat. No. 2,732,436 issued Jan. 24, 1956 to A. J. Aikins, N. Botsford, A. P. Boysen, Jr., E. Dietze, W. D. Goodale, Jr., and A. H. Inglis.

Although prior art equalizers of the type indicated have proved to be adequate in many respects for their intended purpose, the equalization accomplished lacks flexibility and is therefore less than ideal in performance, particularly on loop lengths that are unusually short or exceptionally long. Moreover, prior art equalizers have been designed for compatibility with conventional telephone set components and networks, such as carbon microphones and inductance coil hybrids for example, rather than being designed for compatibility with electromagnetic transducers and solid-state—thin film hybrids. Additionally, prior art arrangements make no use of the increased scope and flexibility of equalizers potentially made available when ready means of amplification are at hand. Accordingly, a broad object of the invention is to improve the equalization circuits in subscriber telephone set speech networks. A more specific object is to simplify equalization circuits.

SUMMARY OF THE INVENTION

The foregoing objects and additional objects are achieved in accordance with the principles of the invention by the utilization of a modified transistor differential amplifier circuit which effects a combination of the functions of amplification (or preamplification), gain magnitude equalization and frequency response characteristic equalization. Although the functions of magnitude and frequency equalization are combined in a single multifunction circuit, the circuit is usable for either function alone. One important aspect of a circuit in accordance with the invention is that its inherent balance and its high common mode rejection capability permit operation directly from an unregulated source of power thus eliminating the need for a regulated power supply.

The circuit in accordance with the invention employs first and second transistor-resistor-diode combinations connected in parallel across the line or other source of control voltage. The use of a single common biasing transistor controlled by the voltage drop across a third resistor-diode combination ensures a current through the diodes of the first two combinations that varies with the control voltage. Both the threshold and rate of equalization are fixed by the number of diodes in the respective combinations.

DETAILED DESCRIPTION

Figure 1:
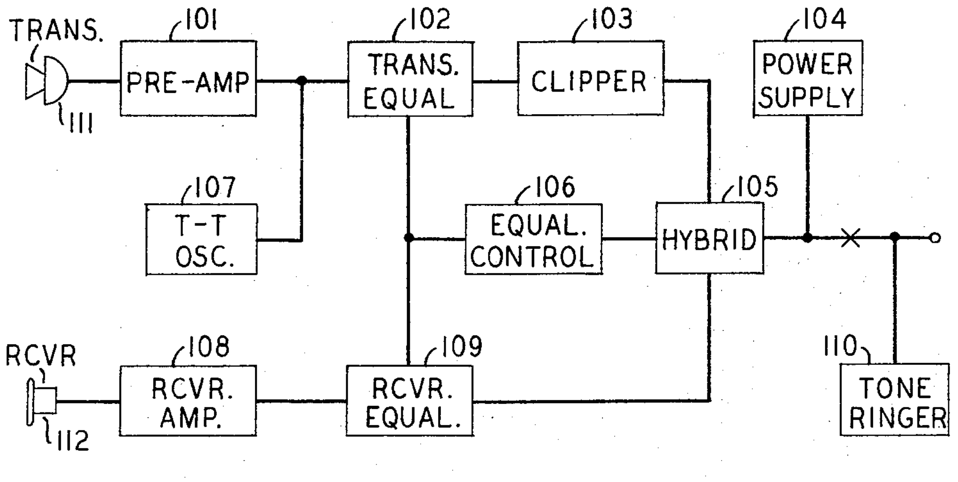
FIG. 1 PRIOR ART
FIG. 1 is a block diagram of a complete telephone speech network for an electronic telephone set of the type in which an equalizer circuit in accordance with the invention may be employed.

The electronic telephone set illustrated in block form in FIG. 1 is similar to the circuit disclosed in the copending application of R. E. Holtz and J. A. Markevich, Ser. No. 883,073, filed Dec. 8. 1969. It will be noted that the preamplifier 101, the transmission equalizer 102 and the equalizer control circuit 106 are indicated by separate and distinct function blocks and that the power supply 104, although not indicated as such, is required to be regulated in order to serve a conventional equalizer properly. An important aspect of the invention, however, combines the functions of preamplification, transmission equalization and equalization control in a single simple circuit which operates with a completely nonregulated power supply.

Figure 2:
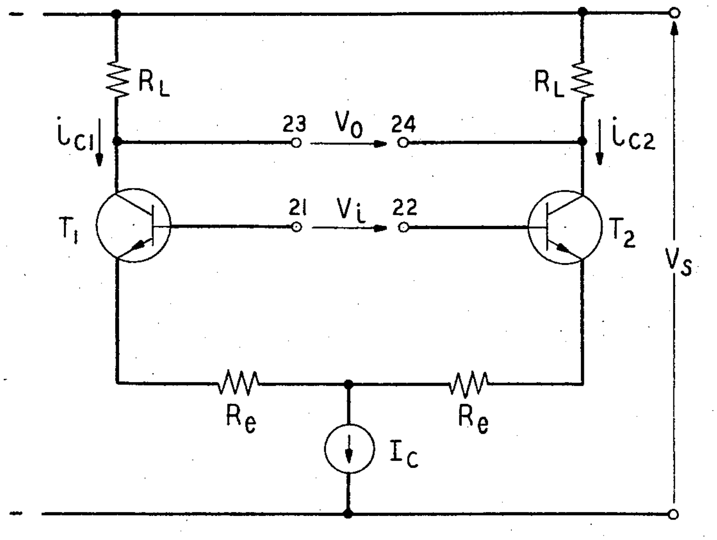
FIG. 2 is a schematic circuit diagram of a portion of an equalizer in accordance with the invention.

In accordance with the invention, a differential amplifier circuit, modified as shown in FIG. 2, is employed as an equalizer. The circuit includes a pair of transistors $T_1$ and $T_2$ together with equal load resistors $R_L$ and equal resistors $R_e$ in the emitter circuits. Input signal voltage $V_i$ is applied to the base circuits across the terminals 21–22, and the output or differential collector voltage $V_o$ is taken from across the terminals 23–24. The current through transistor $T_1$ is designated as $i_{c1}$ and the current through transistor $T_2$ is designated as $i_{c2}$.

The differential amplifier of FIG. 2 has the property that the gain $V_o/V_i$ is dependent upon circuit element values and independent of the control or line voltage $V_s$. Common mode components are assumed to be rejected perfectly although actual rejection on the order of 80–100 db is adequate and practical. It is for this reason that the power supply $V_s$ need not be regulated or even filtered. The low frequency differential gain $A_v$ of the circuit of FIG. 2 may be defined as follows:

$$A_v \cong (R_L/R_e). \quad (1)$$

Suitable gain equalization for the circuit of FIG. 2 requires that the gain $V_o/V_i$ increase as the supply voltage $V_s$ is reduced. Loop length variations may produce a range of values for $V_s$ from 15 volts (on short loops where low gain is satisfactory) down to 3 or 4 volts (on long loops where high gain is needed).

Figure 3A:
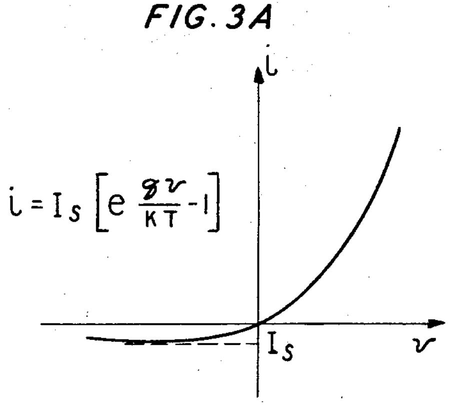
FIG. 3A and 3B are plots illustrating the characteristics of diodes utilized in a circuit in accordance with the invention.
Figure 3B:
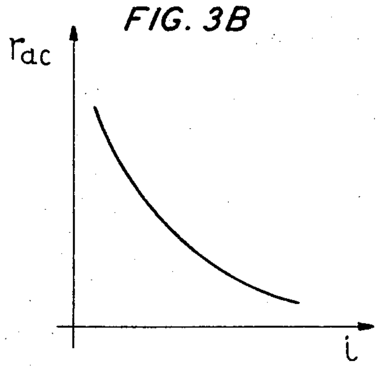
Figure 4:
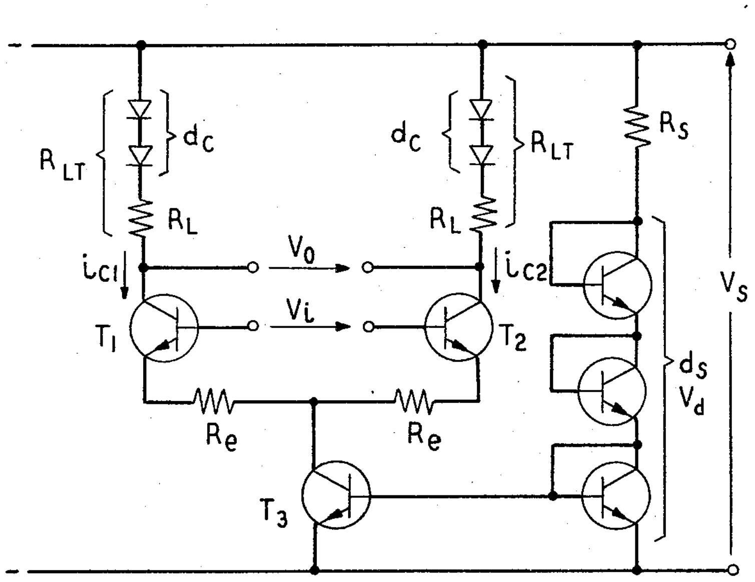
FIG. 4 is a schematic circuit diagram of an equalizer in accordance with the invention, including the biasing arrangement.

Inasmuch as the circuit of FIG. 2 is essentially balanced, the two collector currents $i_{c1}$ and $i_{c2}$ remain equal and vary directly with $V_s$. The a.c. gain $V_o/V_i$ is invariant, however, because it is nearly equal to the fixed ratio $R_L/R_e$ which is of course independent of the supply voltage $V_s$. Gain equalization is achieved by designing this resistance ratio to be dependent upon the supply voltage $V_s$ in some appropriate manner. This dependence is accomplished in accordance with the invention by employing one or more diodes $d_c$ in series with each of the resistors $R_L$ as shown in FIG. 4. The a.c. resistance of a diode varies inversely with the bias current applied thereto, as illustrated by the characteristic curves shown in FIG. 3A and 3B. The diode voltage and current relation may be expressed as follows:

$$i = I_s[e^{qv/KT} - l], \quad (2)$$

where $I_s$ and $i$ are related as shown in FIG. 3A. The incremental slope of the $i$-$v$ plot of FIG. 3B is the small signal conductance which may be expressed by the following:

$$1/r_{ac} = \delta i/\delta v = (i - I_s)\, q/KT, \quad (3)$$

where $r_{ac}$ is the diode a.c. resistance. The use of silicon diodes, even at very low values of current, permits the following approximation:

$$i - I_s \approx i, \quad (4)$$

so that, $$R_{ac} = KT/qi. \quad (5)$$

This is the inverse relationship indicated by the plot of FIG. 3B.

In accordance with the invention, for a given range of bias currents, the a.c. diode resistance may exceed that predicted by using multiple series diodes $d_c$ connected as shown in FIG. 4. It will also be noted that the source of bias current $I_c$, indicated only schematically in FIG. 2, is illustrated by specific current elements in FIG. 4, namely, a transistor $T_3$ with its base circuit connected to the diodes $d_s$ and through a biasing resistor $R_s$ to one side of the line. Connection to the other side of the line is by way of the bottom one of the three diodes $d_s$. As indicated, each of the diodes $d_s$ is provided by a bipolar NPN transistor with its collector and base shorted. This arrangement facilitates fabrication by integrated circuit techniques.

The total bias current in transistor $T_3$ depends upon the difference between $V_s$, the supply or line voltage, and $V_d$, the total voltage drop across the diodes $d_s$, and upon the inverse of the magnitude of the resistor $R_s$, which may be expressed as follows:

$$(V_s - V_d)/R_s. \quad (6)$$

When $V_s$ approaches the level of $V_d$, the current is small and the amplification gain is relatively high since the value of the resistance $R_{LT}$ is relatively high. When the voltage $V_s$ exceeds the voltage $V_d$, the current rises appreciably in the resistor $R_s$ and in transistor $T_3$. The current through the resistors $R_L$ and through the diodes $d_c$ increases markedly also and the amplification gain decreases in the same way. Accordingly, it is evident that the number of diodes $d_s$ determines the threshold for equalization.

The current through the resistor $R_s$ is substantially equal to the collector current of the biasing transistor $T_3$. In the circuit as shown in FIG. 4, the three diodes $d_s$ in the biasing circuit are the elements which determine the threshold of equalization, whereas the bottom or lowest one of these $d_s$ diodes also operates to control current in transistor $T_3$, forcing the current in the collector of transistor $T_3$ to be the same as the current through the resistor $R_s$.

Owing to the balanced nature of the circuit, the bias current in each of the transistors $T_1$ and $T_2$ is half of the collector current of transistor $T_3$. As indicated above, the gain of the amplifier is essentially $R_{LT}$ *divided by* $R_3$. In accordance with the diode characteristic indicated in FIG. 3B, the resistance of the diodes $d_c$ of FIG. 4 is reduced as the current through these diodes increases. As a result, the gain of the amplifier necessarily depends on the voltage level $V_s$. More specifically, the gain of the amplifier varies as the resistance of the diodes $d_c$ changes. A feature of the invention is that the rate at which equalization varies with the line voltage $V_s$ may be changed by employing several diode in tandem in lieu of the pair of diodes $d_s$ shown in FIG. 4. The greater the number of $d_c$ diodes employed, the more responsive the total resistance $R_{LT}$ becomes in relation to variations in $V_s$. When only a very few $d_c$ diodes are employed, the total value of the resistance $R_{LT}$ may approach the resistance of the fixed resistor $R_L$ which of course does not vary at all with the level of $V_s$. Accordingly, it is evident that the rate of equalization can be increased by the use of additional $d_c$ diodes, and the threshold above which equalization exists may be raised by increasing the number of $d_s$ diodes.

Figure 5A:
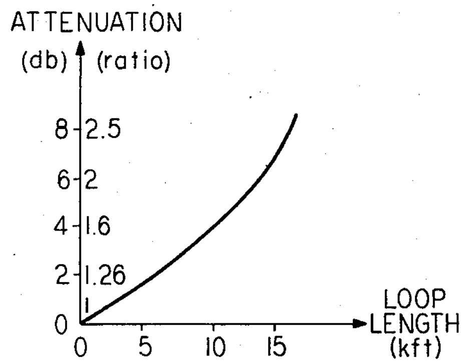
FIG. 5A is a plot illustrating typical loop attenuation with loop length and FIG. 5B is a plot illustrating the gain supplied by the circuit of FIG. 4 with increasing loop length.
Figure 5B:
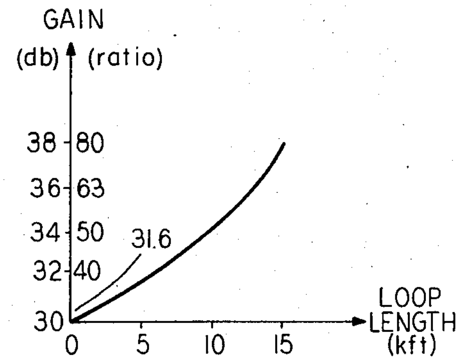

An estimate of the range of gain needed for equalization in a given system can readily be computed. Assume first that cable attenuation varies with loop length as shown in FIG. 5A and that a nominal gain of 30 db is used in short loops. The circuit gain should then vary as shown in FIG. 5B to maintain a given signal level at the central office.

Loop length can be sensed at a telephone set by providing a measure of either line current or of the voltage across the set. In the circuit of FIG. 4 variations in loop length are detected automatically via the line voltage $V_s$ which establishes the value of the collector currents $i_{c1}$ and $i_{c2}$, thereby changing the diode resistance component of $R_{LT}$ as described. In accordance with the invention, the circuit shown in FIG. 4 or the gain of a cascade of several similar stages can be matched to the requirements of both short and long loops and the gain of equalization will vary monotonically at intermediate points.

Figure 6:
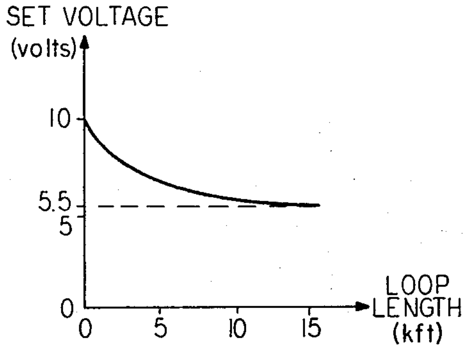
FIG. 6 is a plot of typical station set voltage versus loop length.

The voltage across a typical telephone set depends on loop length as illustrated in FIG. 6 where it is seen that the rate of voltage reduction with increasing loop length decreases on longer loops. This nonlinear performance is accommodated by the features of the invention in that the resistance of the $d_c$ diodes, illustrated in FIG. 3B, changes more quickly for low currents (long loops) thereby providing grater sensitivity to variations at long loops. As indicated above, both equalization and nonlinearity can be controlled further by properly selecting the number of $d_c$ and $d_s$ diodes since it is found that a greater number of diodes improves overall equalization linearity with loop length.

Figure 7:
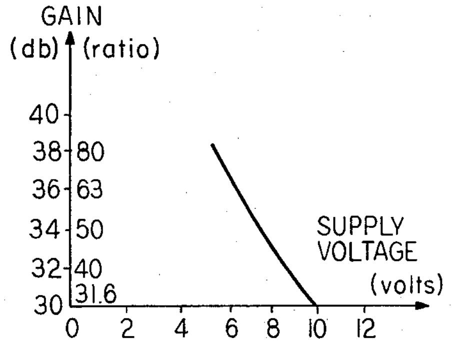
FIG. 7 is a plot of circuit gain versus supply voltage.

It may also be noted that the control current $I_c$ can be derived from line current or, in a different system environment, from some other suitable control signal. Data derived from one illustrative embodiment of the invention can be combined to bandwidth design requirements for gain equalization, as shown in FIG. 7.

The circuit of FIG. 4 may be modified further in accordance with the invention to provide frequency response equalization simultaneously with gain equalization so that compensation is provided for the frequency response of a communication cable that typically changes with loop length. In general, transmission bandwidth varies inversely with frequency. It is therefore necessary to have the telephone frequency response vary with loop length in accordance with a specifically defined relation. This can be accomplished by utilizing the circuit combination illustrated in FIG. 8.

Figure 8:
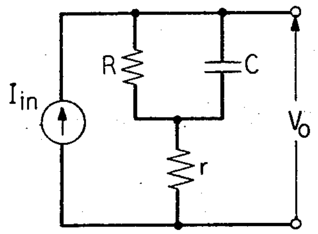
FIG. 8 is a schematic circuit diagram of a portion of a preliminary frequency equalizer circuit in accordance with the invention.
Figure 9:
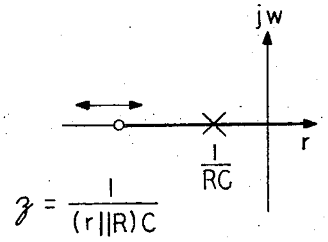
FIG. 9 is a pole-zero pattern plot for a frequency equalizer circuit in accordance with the invention.

The gain of the circuit in FIG. 8 may be stated as follows:

$$Z_{21}(s,r)=\frac{V_o}{I_{in}}=(R+r)\,\frac{1+SC\left(\frac{Rr}{R+r}\right)}{1+SRC}, \tag{7}$$

which has the pole-zero constellation shown in FIG. 9. Since the resistor $r$ may be taken as the diode resistance $d_c$ of FIG. 4, it may be stated that by inspection the gain magnitude equalization may be designated $Z_{21}(o,r)$.

Figure 10A:
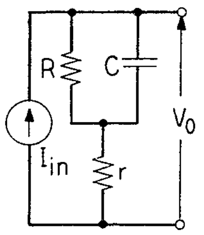
FIG. 10A, 10B and 10C illustrate the development of a final form of the frequency equalizing portion of the circuit shown in FIG. 8.
Figure 10B:
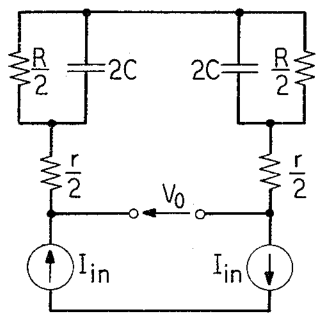
Figure 10C:
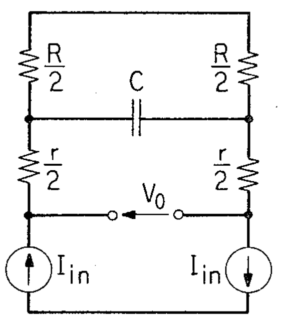
Figure 11:
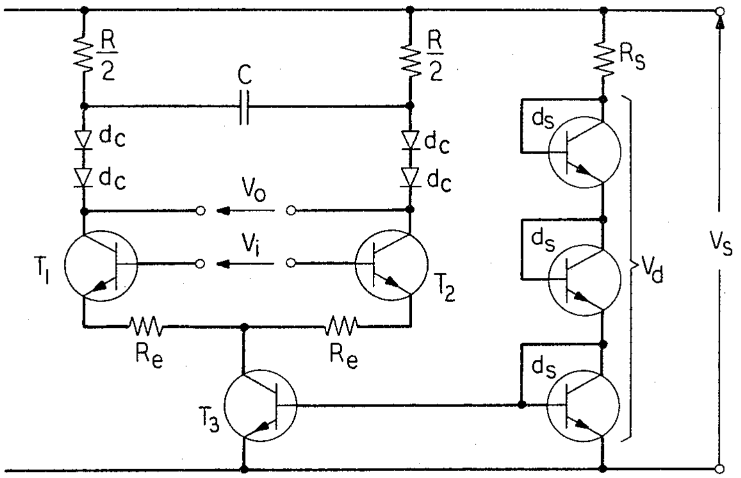
FIG. 11 is a schematic circuit diagram of a circuit in accordance with the invention with both gain and frequency response equalization.
Figure 12:
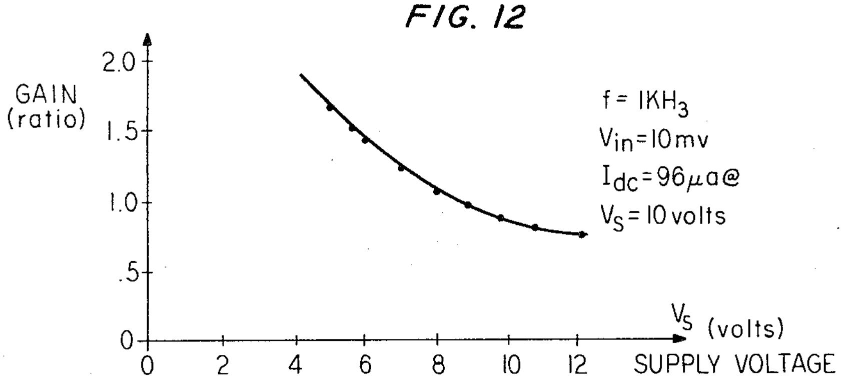
FIG. 12 is a plot of experimental measurements for gain versus supply voltage in a circuit in accordance with the invention.

Note that the fixed pole at $\omega = 1/RC$ can be eliminated by a subsequent (or prior) transmission zero located at that frequency. The circuit of FIG. 9 can be realized by a balanced amplifier stage, utilizing the fact that the circuits shown in FIG. 10A, 10B and 10C are equivalents. The final circuit which needs no regulated power supply and which performs both gain and frequency response equalization is illustrated in FIG. 11. Measured test results from the circuit of FIG. 11 produce the gain (ratio) versus supply voltage curve shown in FIG. 12. It is noted that gain varies inversely with loop length and, by inspection of coordinates, it has been determined that this variation follows the predicted hyperbolic function.

It is to be understood that the embodiment described herein is merely illustrative of the principles of the invention. Various modifications thereto may be effected by persons skilled in the art without departing from the spirit and scope of the invention.

What is claimed is:

1. In a communication system, a source of control voltage connected across first and second conducting lines, a differential amplifier connected between said lines, said amplifier including first and second transistors having collector-emitter paths connected in parallel across said lines, each of the collector electrodes of said transistors being connected to a common one of said lines by way of a respective series combination of a resistive element and at least one diode, each of the emitter electrodes of said transistors being connected to the other of said lines by way of a respective resistor and the collector-emitter path of a third transistor, means responsive to the level of said control voltage for regulating the bias current of said third transistor, signal output means connected between the collector electrodes of said first and second transistors, and signal input means connected between the base electrodes of said first and second transistors.

2. Apparatus in accordance with claim 1 wherein said regulating means comprises at least one diode connected across said lines.

3. Apparatus in accordance with claim 1 including a capacitive element connected between the common terminals formed by each of said combination of a resistive element and of said diode.

4. Apparatus in accordance with claim 2 wherein one terminal of said last named diode is connected to said first line and to the base of said third transistor and wherein the other terminal of said last named diode is connected to said second line.

5. An equalization circuit for a telephone speech network comprising, in combination, a differential amplifier connected across a pair of line terminals, said amplifier including first and second transistors with the emitter-collector paths thereof in parallel relation, means for applying an common input signal across the base electrodes of said transistors, means for extracting a differential output signal from across the collectors of said transistors, at least one diode in transistors, collector circuit of each of said transistors, the rate of equalization being determined by the number of said diodes, and means for biasing said transistors 6. Apparatus in accordance with claim 5 wherein said biasing means comprises a third transistor having the collector electrode thereof connected to the emitter electrodes of said first and second transistors by way of first and second resistors, respectively, the emitter electrode of said third transistor being connected to one of said terminals, and means connecting the base electrode of said third transistor to said terminals.

7. Apparatus in accordance with claim 6 wherein said connecting means comprises a plurality of diodes and a resistive element connected in series relation between said terminals and means connecting the base electrode of said third transistor to a terminal of one of said diodes, the number of said last named diodes being determinative of the threshold level of equalization.

8. Apparatus in accordance with claim 5 including capacitive means connected between the collector circuits of said first and second transistors thereby to provide frequency equalization.

9. Apparatus in accordance with claim 7 including a pair of resistive elements each connecting the collector circuit of a respective one of said transistors to one of said terminals and capacitive means connected across said last named collector circuits thereby to provide frequency equalization.

10. An equalization circuit for a telephone speech network comprising, in combination, a pair of terminals connectable across a telephone line, a transistor differential amplifier connected between said terminals, said amplifier including a pair of parallel amplifying paths connected across said terminals, each of said paths including at least one respective asymmetrically conducting impedance device, the number of said last named device being determinative of the rate of equalization of said circuit, means for biasing the transistors of said differential amplifier including means for establishing the threshold level of equalization, means for applying an input signal directly between the base electrodes of two of said transistors, and means for extracting an output signal from across the collector electrodes of said two transistors.

11. Apparatus in accordance with claim 10 wherein said threshold establishing means includes a plurality of asymmetrically conducting impedance devices, the number of said last named devices being determinative of said level.

12. Apparatus in accordance with claim 10 including capacitive means connecting said parallel amplifying paths thereby to provide frequency equalization.

13. A combination equalizer-amplifier circuit in a telephone speech network which network includes a hybrid circuit for connecting to a telephone line and a transducer, said circuit comprising a differential amplifier including first and second transistors having collector-emitter paths in parallel relation, means including a pair of conductors for connecting said hybrid to said transducer, each of the collector electrodes of said transistors being connected to a common one of said conductors by way of a respective series combination of a resistive element and at least one diode, each of the emitter electrodes of said transistors being connected to the other of said conductors by way of a respective resistor and the collector-emitter path of a third transistor, means responsive to the level of an applied control voltage for regulating the bias current of said third transistor, means for extracting an output signal from across the collector electrodes of said first and second transistors, and means for applying a common input signal between the base electrodes of said first and second transistors.

* * * * *